(12) United States Patent
Magcale et al.

(10) Patent No.: US 9,679,338 B2
(45) Date of Patent: Jun. 13, 2017

(54) SOCIAL MEDIA RECOMMENDATION ENGINE

(71) Applicant: Quantum Capital Fund, LLC, Santa Clara, CA (US)

(72) Inventors: Arnold Magcale, San Ramon, CA (US); Dane Iracleous, Capitola, CA (US); Justin Johns, San Jose, CA (US)

( * ) Notice: Subject to any disclaimer, the term of this patent is extended or adjusted under 35 U.S.C. 154(b) by 448 days.

(21) Appl. No.: 13/675,969

(22) Filed: Nov. 13, 2012

(65) Prior Publication Data
US 2014/0136992 A1 May 15, 2014

(51) Int. Cl.
| | |
|---|---|
| G06F 3/00 | (2006.01) |
| G06Q 50/00 | (2012.01) |
| G06F 17/30 | (2006.01) |
| G06Q 30/02 | (2012.01) |

(52) U.S. Cl.
CPC ............. *G06Q 50/01* (2013.01); *G06F 17/30* (2013.01); *G06Q 30/0269* (2013.01)

(58) Field of Classification Search
CPC ......... G06F 17/30867; G06F 17/30722; G06F 3/048; G06F 3/04817; G06F 3/0487; G06F 17/2229; G06F 17/30802; G06F 17/30814; G06F 17/30849; G06F 1/1626; G06F 1/169
See application file for complete search history.

(56) References Cited

U.S. PATENT DOCUMENTS

| | | | |
|---|---|---|---|
| 6,212,895 B1 | 4/2001 | Richardson | |
| 6,990,395 B2 | 1/2006 | Ransom et al. | |
| 7,058,710 B2 | 6/2006 | McCall et al. | |
| 7,278,273 B1 | 10/2007 | Whitted et al. | |
| 7,525,207 B2 | 4/2009 | Clidaras et al. | |
| 7,738,251 B2 | 6/2010 | Clidaras et al. | |

(Continued)

FOREIGN PATENT DOCUMENTS

| | | |
|---|---|---|
| JP | 2010269641 | 12/2010 |
| WO | 2000048288 | 8/2000 |

(Continued)

OTHER PUBLICATIONS http://www.nolimitssoftware.com/wp-content/uploads/2013/03/DCIM-Guide.pdf.

*Primary Examiner* — William Bashore
*Assistant Examiner* — Rayeez Chowdhury
(74) *Attorney, Agent, or Firm* — Fernandez & Associates, LLP (57) ABSTRACT

Embodiments disclose a recommendation engine that implements a system and method for classifying users and media content, and for determining which media items a particular user will most likely enjoy. By organizing users and media content in a 3 dimensional virtual space and assigning x, y, and z coordinates to each, their relationship and affiliation with/to one another is defined by their distances from each other. When a user rates a media item highly, both that user and that media item move closer together. When a user gives a negative rating to a media item, they move farther apart. Further multiple users who rate the same media item similarly move closer together to form clusters of similar interest groups. This terraforms the virtual space into a natural attraction/separation of like-minded/different-minded users and similar/dissimilar media content.

28 Claims, 9 Drawing Sheets

(56) References Cited

U.S. PATENT DOCUMENTS

| | | | |
|---|---|---|---|
| 8,359,191 B2* | 1/2013 | Chen | G06F 17/30734 704/1 |
| 8,853,872 B2 | 10/2014 | Clidaras et al. | |
| 2002/0010709 A1* | 1/2002 | Culbert | G06F 17/30876 715/234 |
| 2006/0259201 A1 | 11/2006 | Brown | |
| 2007/0213000 A1 | 9/2007 | Day | |
| 2007/0281639 A1 | 12/2007 | Clidaras et al. | |
| 2008/0209234 A1 | 8/2008 | Clidaras et al. | |
| 2009/0037268 A1* | 2/2009 | Zaid | G06Q 30/02 705/14.39 |
| 2009/0083126 A1* | 3/2009 | Koren | G06Q 30/02 705/7.29 |
| 2009/0084297 A1 | 4/2009 | Choi et al. | |
| 2009/0126910 A1 | 5/2009 | Campbell et al. | |
| 2009/0207567 A1 | 8/2009 | Campbell et al. | |
| 2009/0295167 A1 | 12/2009 | Clidaras et al. | |
| 2009/0299824 A1* | 12/2009 | Barnes, Jr. | G06F 3/04847 705/7.39 |
| 2010/0030552 A1* | 2/2010 | Chen | G06F 17/30734 704/9 |
| 2010/0298997 A1 | 11/2010 | Ohba et al. | |
| 2011/0060470 A1 | 3/2011 | Campbell et al. | |
| 2011/0072293 A1 | 3/2011 | Mazzaferri et al. | |
| 2011/0207391 A1 | 8/2011 | Hamburgen et al. | |
| 2012/0042263 A1* | 2/2012 | Rapaport | 715/753 |
| 2012/0136998 A1* | 5/2012 | Hough | G06F 21/10 709/225 |
| 2012/0166433 A1* | 6/2012 | Tseng | G06Q 30/0224 707/728 |
| 2012/0166616 A1 | 6/2012 | Meehan et al. | |
| 2013/0238795 A1 | 9/2013 | Geffin et al. | |
| 2014/0259618 A1 | 9/2014 | Rikoski et al. | |

FOREIGN PATENT DOCUMENTS

| | | |
|---|---|---|
| WO | 2009055368 | 4/2009 |
| WO | 2010129341 | 11/2010 |
| WO | 2012047746 | 4/2012 |
| WO | 2013113138 | 8/2013 |

* cited by examiner

DO YOU HAVE A HEARTBEAT?

[YES] [NO]

ORGANISM ✓

ARE YOU INTELLIGENT ENOUGH TO RATIONALIZE?

[YES] [NO]

HUMAN ✓

DO YOU HAVE A MENSTRUAL CYCLE?

[YES] [NO]

MALE ✓

WERE YOU AN ACTOR IN THE FIFTH ELEMENT?

[YES] [NO]

BRUCE WILLIS ✓

SOCIAL MEDIA RECOMMENDATION ENGINE

FIELD OF INVENTION

This invention relates to social media and user interaction with content through social media generally. More particularly, the present invention relates to classifying and organizing users based on their interaction and affiliation with virtual content, and creating a virtual space for such a classification and organization to make future estimates of content that would be of interest to a user.

RELATED BACKGROUND ART

Users interact with a myriad of content in the virtual world, namely through the World Wide Web. Social media platforms have become increasingly popular and enabling, through which users can surf, browse research and enjoy content. Thus a relationship is established between a real (live) user and content which resides in a virtual space. Users are also afforded the ability to rate content based on their preferences and experience. Content rated can then be clustered together based upon similarity of rating, while users too can be clustered together based on their rating of content.

However, it would be desirable to have a multi-dimensional virtual space wherein a user can be identified in that space, and their preferences, interests, and inclinations can be gauged not only from their rating of content, but their individualities can be asserted by estimating their preference for content relative to one another. It would further be desirable to have a multi-dimensional virtual space that can map preferences and inclinations both objectively and subjectively through the various dimensions in that space. Embodiments disclosed attempt to address that need.

SUMMARY

A method for organizing and classifying users and user associated content in a virtual space, comprising: tagging all content in the virtual space; assigning co-ordinates to the tagged content in the said space; assigning every user a coordinate in the virtual space; and determining user affiliation with the content in the virtual space, wherein said determining further comprises causing the said user and the said content item to travel with respect to each other through the same virtual space, wherein the said travel with respect to each other is based on the user rating of the content such that a high user rating causes the user and the rated content item to move closer together in the virtual space and a low user rating causes the user and the rated content item to move farther apart in the virtual space.

A computer automated system for organizing and classifying users and user associated content in a virtual space, comprising a processing unit and a memory element, and having instructions encoded thereon, wherein the encoded instructions cause the system to: assign a coordinate to each user in the virtual space; assign a coordinate to each content item in the virtual space; allow the user to rate a single or plurality of content items in the virtual space; determine user affiliation based on their rating of the content; wherein the said rating of the content item causes the content item and the user coordinate to travel with respect to each other in the virtual space. A high user rating moves the user and the rated content item closer together in the virtual space and a low user rating moves the user and the rated content farther apart in the virtual space.

A computer automated system for classifying users and media content based on the user's preference for said media content, wherein the system comprises a processing unit and a memory element, and has instructions encoded thereon, which cause the system to: calculate a vector between a user and a user viewed media item; receive a user rating of the viewed media item; determine, based on the received rating, whether the user and media item should move toward each other or away from each other in a virtual space; determine, based on the rating received by the user, the amount that the user and the media item should shift in either direction in the virtual space; wherein the number of times that the media item has been rated is also taken into account, reducing the severity of the shift for the media item with each subsequent rating; and wherein the user's movement is independent of the number of times the said media item is rated.

A method for intuitively organizing and classifying users and user associated content within a virtual dimension, comprising intelligently assigning a coordinate to each user and each piece of content in the virtual dimension and adaptively determining the user affiliation with the said piece of content. Adaptively determining user affiliation further comprises user rating of the content such that highly rated content is caused to move closer to the user in the virtual dimension, and lowly rated content is caused to move further away from the user in said virtual dimension. It also comprises calculating a vector between a user-viewed piece of content and the user, and determining how the piece of content should be positioned in relation to the user. The determining step further comprises determining how close or far the piece of content should be moved from the user, and is based on the rating by the user and at least one of the number of times it has been rated by any user.

A system for intuitively organizing and classifying users and user associated content within a virtual dimension, comprising a processing unit and a memory element, and having thereon encoded instructions which cause the system to intelligently assign a coordinate to each user and each piece of content in the virtual dimension, and adaptively determine the user affiliation with the said piece of content. The adaptive determination of user affiliation further comprises user rating of the content such that highly rated content is caused to move closer to the user in the virtual dimension, and lowly rated content is caused to move further away from the user in said virtual dimension. It also comprises calculating a vector between a user-viewed piece of content and the user; and determining how the piece of content should be positioned in relation to the user. The determining also comprises determining how close or far the piece of content should be moved from the user, and is further based on the rating by the user and the number of times it has been it has been rated by any user.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

The following terms have these corresponding definitions in the description:

COLD START—The initial setup of users and content within a virtual space. This virtual space further enables creation of a single or plurality of orbital clusters.

VIRTUAL SPACE—A multi-dimensional space in which is contained user and content information, and user affiliation with the contained content.

TAG FS—A collection of tags organized in a hierarchical manner where one tag can be the parent, child, sibling, descendent, cousin, or ancestor of another tag.

MOON—A representation of a tag in the virtual space. It is simply a sphere of as many dimensions as the virtual space. Its radius is dependent on its number of descendants, and its center point is dependent on its parent moon's location. It may contain other moons and/or items.

ORBITAL CLUSTER—A collection of moons attached to each other so that their parent—child attachment relationship mimics the parent—child relationship of the tag FS. They are attached to each other in such a way that a child moon's center point is a random point on the surface of its parent moon.

ATTRACTANT FORCE—Occurs when a user has a positive opinion of a content item. The item and coordinates representing the user are pulled toward each other in a varying magnitude, dependent on the severity of the user opinion or/and rating of the content item.

REPELLANT FORCE—Occurs when a user has a negative opinion of a content item. The item and coordinates representing the user are pushed away each other in a varying magnitude, dependent on the severity of the user opinion or/and rating of the content item.

Embodiments disclosed include a method and system for organizing and classifying users and user associated content in a virtual space. In a preferred embodiment, all content is initially categorized and tagged, wherein each content item is assigned a coordinate in the virtual space; all users are also assigned coordinates. Based on category, similarity and user affiliation, content and users are clustered together, resulting in the creation of a single or plurality of orbital clusters. Preferably users with similar likes (and dislikes) are clustered together. Additionally and alternatively, content items liked by the same user or users are also clustered together.

A preferred embodiment includes a setup engine that automatically implements a sequence of steps to accurately organize content without any user input. Preferably user affiliation with a content item is determined by causing the said user and the said content item to travel with respect to each other through the same virtual space. Essentially a user rates a selected content item, and based on the rating the content item receives, movement between the user and the content item is caused. A high user rating causes the user and the rated content item to move closer together in the virtual space and a low user rating causes the user and the rated content item to move farther apart in the virtual space. Preferably, user affiliation determination comprises creating a vector between a user selected content item and the assigned user coordinates.

All content, including media items, are assigned a coordinate in a virtual space via an 'x', 'y' and 'z' axis, creating a perfect 3D cube. While a disclosed embodiment is implemented in a three dimensional virtual space, a multi-dimensional virtual space can be created having infinite number of dimensions, as would be apparent to a person having ordinary skill in the art. In an embodiment, each dimension has a subjective (subjectivity) component and an objective (objectivity) component. It is possible that the first of the n (say) dimensions has an entirely subjective (or objective) component, and the last (n) dimension has the opposite, that is an entirely objective (or subjective) component, as the case may be. Everything in between has varying subjective and objective components. Location information for all content can be obtained by analyzing the Tag FS and forming an orbital cluster. The orbital cluster is a collection of hierarchical multi-dimensional spheres, called moons, connected by their respective midpoints. Each moon is a tag, or category. If moon A represents "Organism", and if moon B, representing (say) "Human", is a descendent of moon A, then anything on moon B or any of its descendants can also be considered "Organism", although it is more precise to define an item by its most direct moon.

Figure 1:
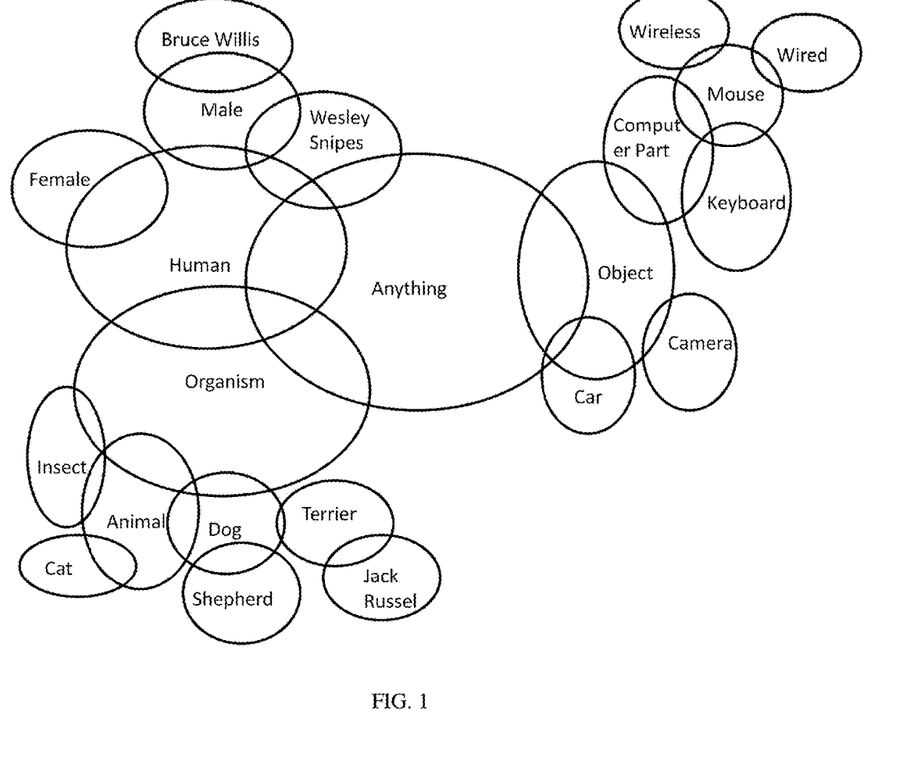
FIG. 1 illustrates an orbital cluster
Figure 2:
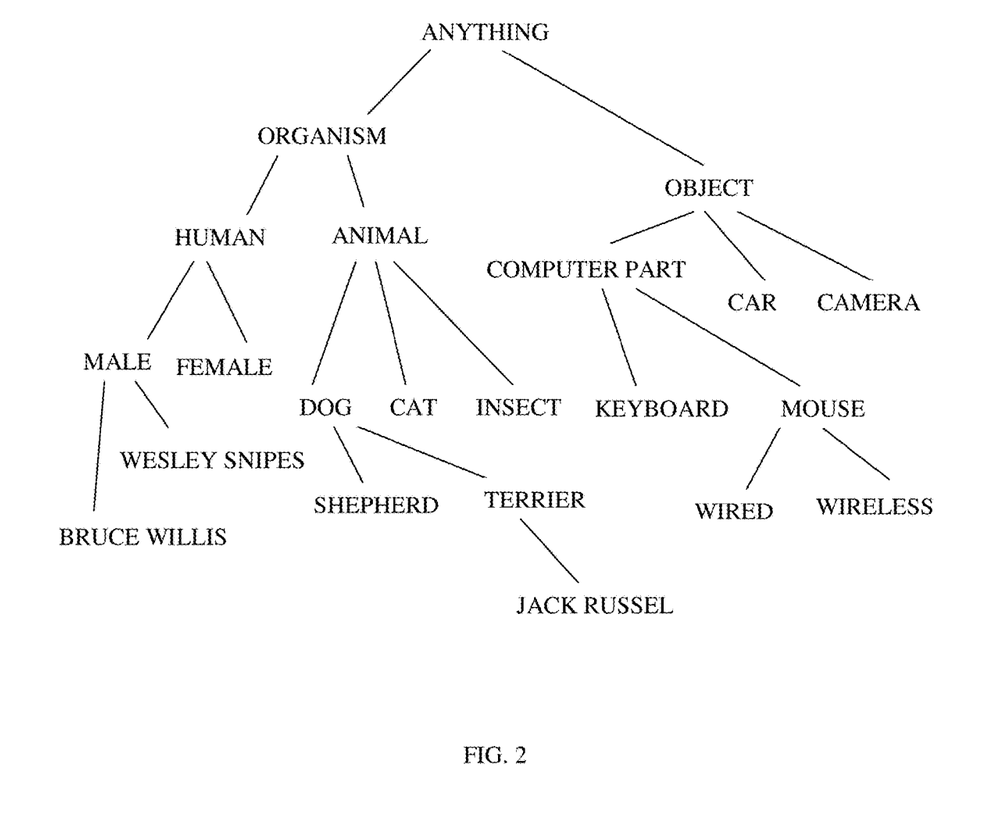
FIG. 2 illustrates the tag FS from which orbital cluster of FIG. 1 is formed.

FIG. 1 illustrates an orbital cluster formed from the tag FS illustrated in FIG. 2. While the orbital cluster illustrated in FIGS. 1 and 2 are represented in two dimensions, it can be extended to any number of dimensions as would be apparent to a person having ordinary skill in the art. A moon's children moons are arranged along its surface area uniformly and randomly.

All users are assigned a random coordinate in the virtual space. Preferred embodiments include intelligently assigning a coordinate to each user and each piece of content in the virtual dimension and adaptively determining the user affiliation with the said piece of content. One embodiment comprises placing the user in the space by making some initial determinations on the user's likes and dislikes. This is done by providing a series/sequence of queries to the user. The answers to these queries provide information to traverse the tag FS, and thus narrow in on the exact moon on which to place the user. Alternatives to the above are possible, as would be apparent to a person having ordinary skill in the art.

Figure 3:
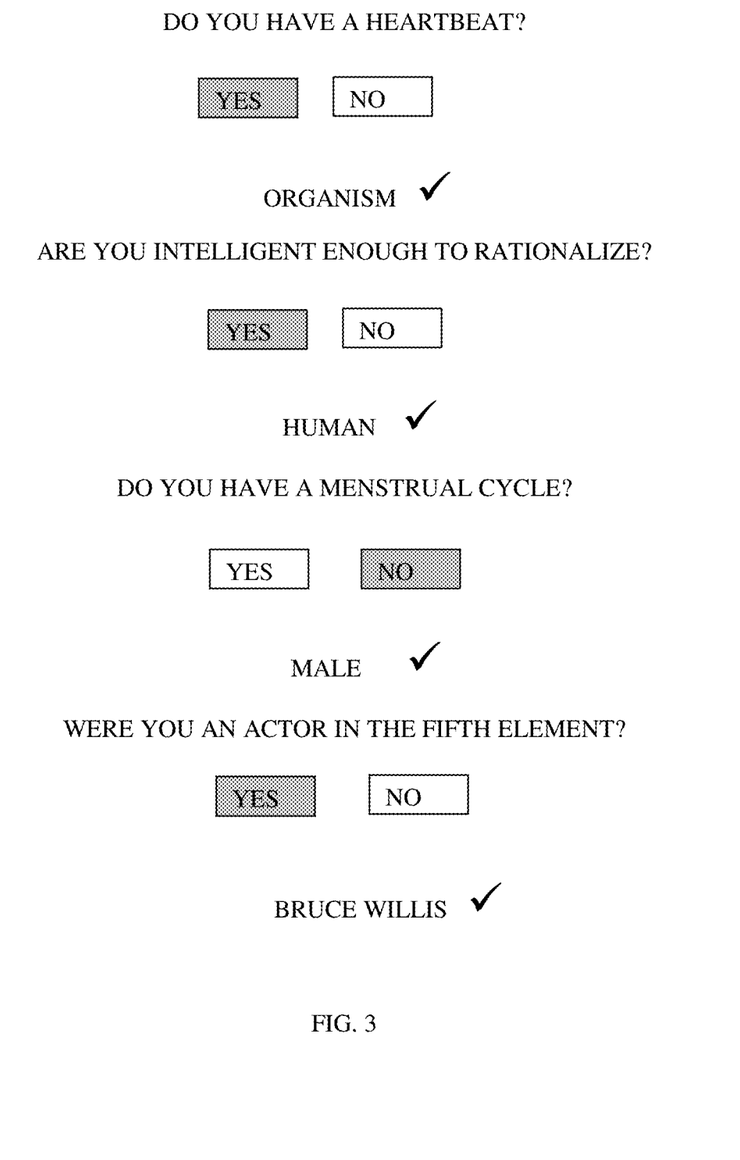
FIG. 3 illustrates an example interactive sequence of queries to classify.
Figure 4:
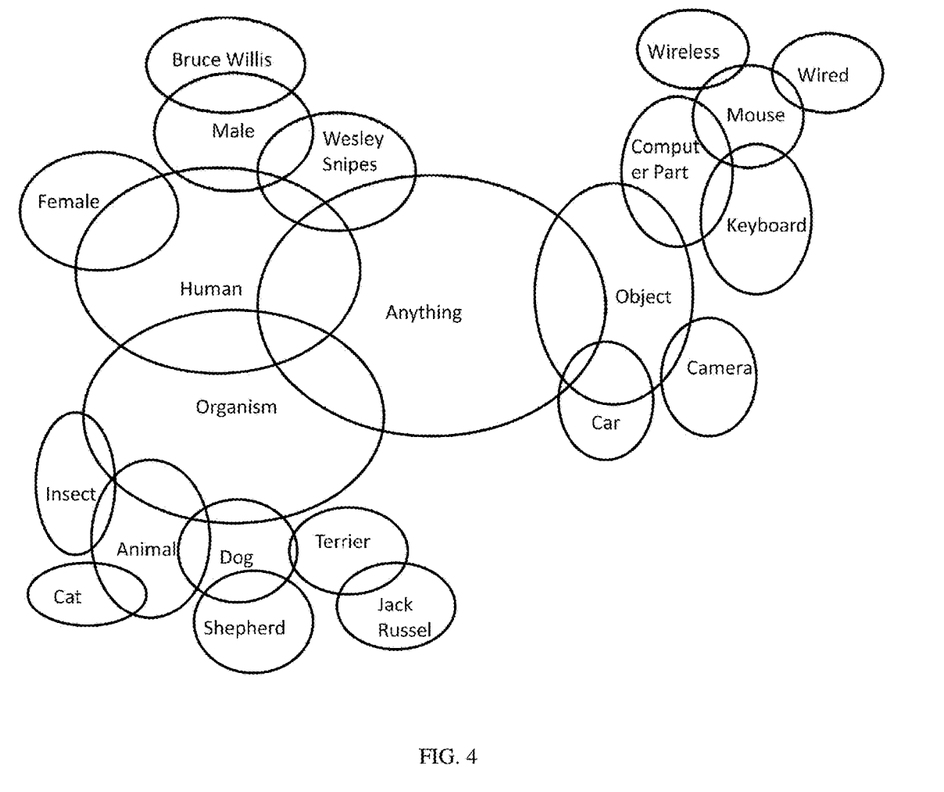
FIG. 4 (FIG. 1) illustrates the spatial sequence on how we arrived there.

FIG. 3 illustrates an example interactive sequence of queries to classify something: The sequence of queries and answers above would place the user in the "Bruce Willis" moon. FIG. 4 illustrates the spatial sequence on how we arrived there.

Figure 5:
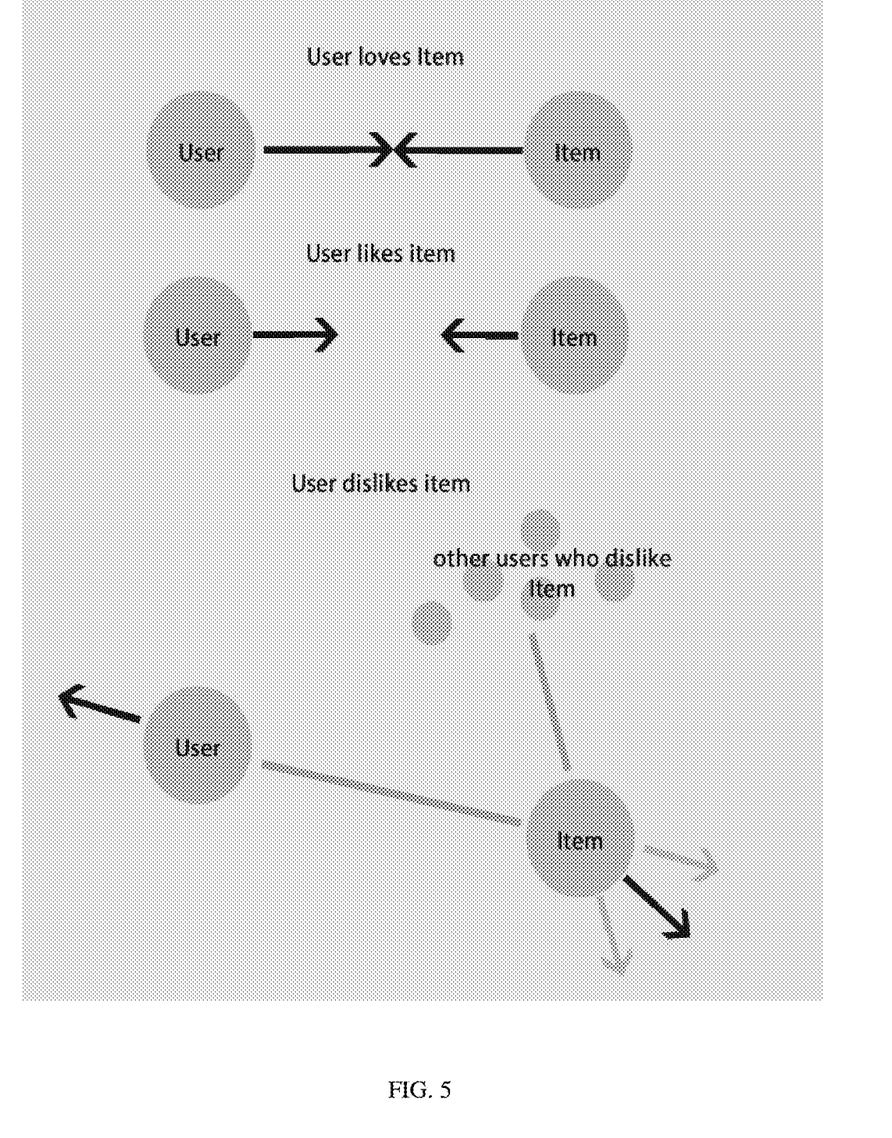
FIG. 5 illustrates the described scenarios between a user and an item, and between multiple users and a popularly liked or disliked item.

As users interact with the media content, both users and media content travel through the virtual space. When a user rates a media item, the user and media item are attracted to each other or repelled by each other depending on whether the rating was positive or negative. In either situation, a vector is created between the user and media item. For an attraction action, the user and media item travel toward one another along this vector. For a repellent action, the user and media item travel away from one another. An attracting or repelling force has two characteristics: Direction—This is simply a vector that determines where the force is applied; and Magnitude—This represents the power of the force. If it is negative, it is a repellent force, and if it is positive, it is an attractant force. In an attractant action, the user and the media item travel toward one another along the vector between them. For a repellent action, the user and the media item travel away from one another. However, in addition to traveling away from the user, the previous users who dislike the item are also taken into account. The average vector between the previous users and the current user is taken and applied to the force for the item. FIG. 5 illustrates the scenarios between a user and a content item's affiliation with the user, and between multiple users and a popularly liked or disliked item. Several variations are possible as would be apparent to a person having ordinary skill in the art.

Figure 6:
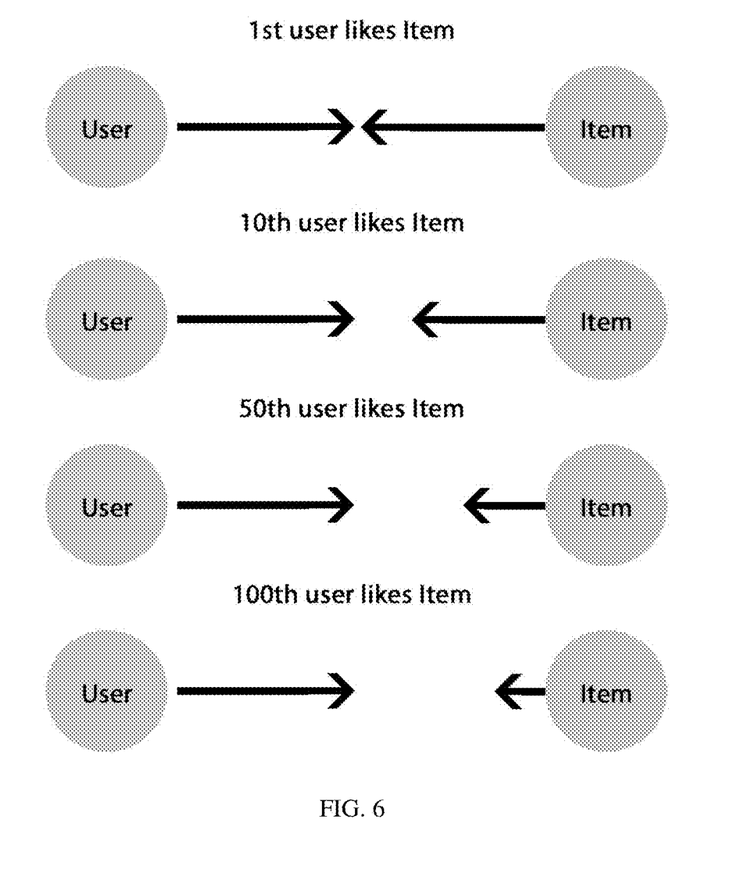
FIG. 6 illustrates the user relationship with a selected media item and the distance each will travel in the virtual space.

Additionally, the number of ratings each media item has been given is maintained. This number influences the amount by which the media item can travel. The more times a media item has been rated, the less it is able to travel. Preferably, ratings of the content items are aggregated, users' rating the content items are identified, and the identified users are clustered in a single or plurality of interest groups based on content items rated. In a preferred embodiment, a media item is more heavily influenced by the first users who interact with it, resulting in a more stable virtual space that accounts for all the users who have rated the media item. While a frequently rated media item travels less with each rating, a user, travels the same distance regardless of the number of ratings he has given; preferred embodiments allow that the user is not limited by his or her past decisions. FIG. 6 illustrates the user relationship with a selected media item and the distance each will travel in the virtual space.

An example embodiment works as follows: Say a user's opinion of content is represented by a rating from −10 to +10. If the user gives the content item a rating of less than zero, then the user is assigned a location further away from the content item based on the rating. Additionally, the average coordinates of the last 100 users that also rated this particular content item low, are also taken into account. Further this average is taken and averaged with the user's coordinates. The user's new location in the virtual dimension is thus calculated. Let's call this new location X. Now the content is moved away from the user's location along the vector between X and the content, but with a hindrance. Essentially, the more times this content item has been rated by any user, lesser is the movement of this content item along the vector. Thus with each subsequent low rating, the movement along the relevant vector away from the user, is reduced slightly. Additionally and alternatively, another modifier includes reducing the movement of the user (X) and the content item even further with respect to each other, when there is already a greater initial distance between X and the content item—this prevents an already distant user from increasing their distance from the low ranked content item even more. Essentially, since it can already be inferred that the user does not like the content item (due to their great distance) disliking the content item again should not at this point linearly separate the user from the content item. Thus moving the user away from (or towards) the content item along the vector between the user and the content item needs to be indicative of the users lack of preference (or preference as the case may be) for that content item, and thus moving a user further away from (or towards) content from which he or she is already distant (or very close), is unnecessary.

On the other hand, say a user gives the content item a rating greater than zero, the content item is moved closer to the user and along the vector between the content item and the user. Again the more times this content is rated positively, the less the movement of the content item towards the user with each subsequent rating. However the user's movement is not restricted and a positive user rating causes the user to move unhindered, along the vector, towards the content item. As a result of this system, the virtual space of media content naturally progresses to a state of organization based on likeness. Users are able to travel freely between these clumps of similar media items through continual interaction.

Figure 7:
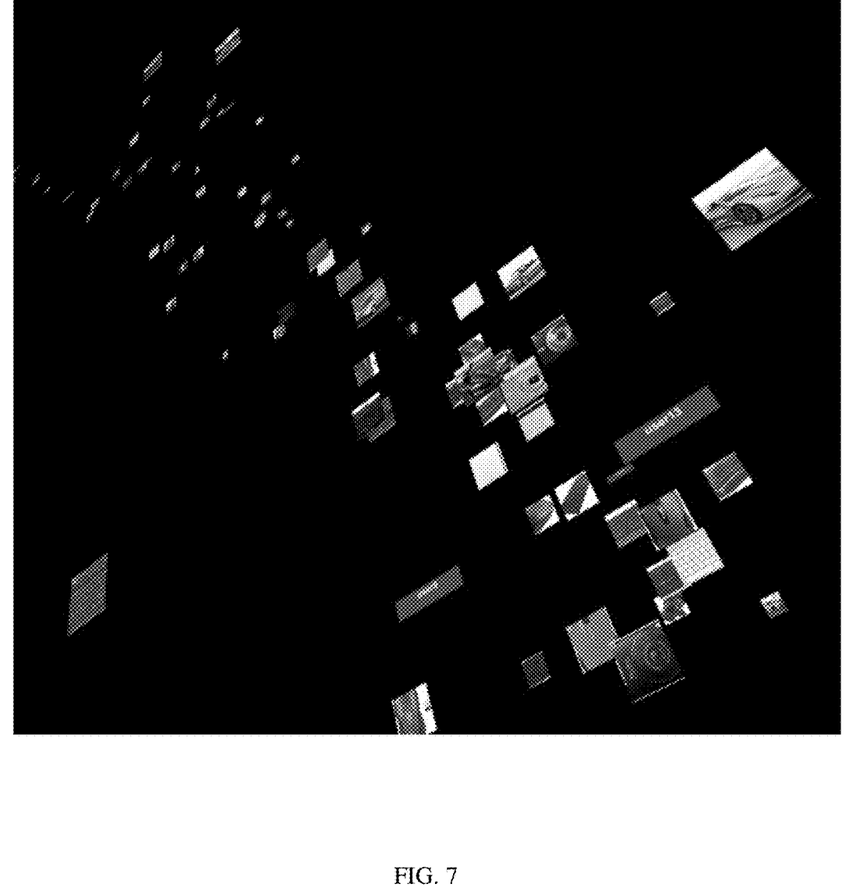
FIG. 7 is a screen shot in the beginning phase of the terraforming process, and illustrating that the closest media items to a user at any given point in time act as the recommended media items for that user.

Illustrated in FIG. 7 is a preferred embodiment wherein the closest media items to a user at any given point in time act as the recommended media items for that user.

Conception and Rationalization—

The novelty of the recommendation engine is that it simulates a real world clique situation where the user is able to freely move between cliques, and to a less extent, influence those cliques with their own individual power. This terraforming of the virtual space simulates a group of strangers placed in a room together and slowly moving towards or away from each other as they get to know each other, based on similar interests. From a bird's eye view perspective, the density of people amasses in certain areas, creating social groups of similar minded people. The recommendation engine works exactly the same way except on a user media relationship.

The recommendation engine addresses the challenges of classification driven by individuality. The essential premise is the recognition that every user in the social media or/and other space is an individual and thus a different personality. Individual users have different (individual/personal) interests and thus enjoy/prefer certain types of media or/and content more than others. However, while each user is unique, their uniqueness can be quantified by comparing them to other users. Essentially their individualities can be objectively quantified with respect to each other. User A may be more similar to User B than he or she is to User C. Thus, there is a way to organize users in a virtual space so that their distance between each other is a direct measure of their similarity (and difference). In this context, the recommendation engine can transcend and/or super cede formal classification of users, wherein amassing user's together indicates their similarity without formally classifying them—so without formal classification of what kind of users amass together, it is possible to tell that those users amassed together are similar. By adding media content to the virtual space and allowing that media content to shift through that space by way of user interaction, we provide a context for the user—user similarity. Without the media content, all we know is that User A and User B are similar because their positions are close in the virtual space. By adding media content, we see that User A and User B are similar, and since they exist in an area with photos of cats (say), we come to the conclusion that User A and User B are similar because they both like photos of cats.

Preferred embodiments can analyze this information to estimate and predict what other kinds of content or/and media User A and User B enjoy. Since in an adjacent area (say) of the virtual space, there are photos of dogs, it can be estimated that User A and User B will also enjoy photos of dogs. On the other hand (say), on the other side of the virtual space, there are photos of wars, which photos are far away in the virtual space from the users' coordinates. This indicates that User A and User B will not enjoy viewing photos of war, because they are very far from those photos. They can, however, move towards those photos of war by rating certain media items highly—media items that are on the path to the other side of the virtual space. While User A and User B have similarity by virtue of the fact that they enjoy photos of pets, User C and User D are similar because they enjoy photos of war. While at this moment, they are in an area of virtual space that probably contains gruesome photos of death, violence, and destruction, if they are one day feeling particularly fluffy they may decide to rate the less violent photos highly, causing them to follow a path away from the war photos. Perhaps on the way out from the war section, they will pass through a section of photos of poverty. As they continue to rate certain items highly and others low, they might pass through photos of politics and presidents. Then, they might continue through a section of government architecture photos, then residential architecture photos, then photos of families, and finally, to photos of pets. They are now near User A and User B who still enjoy photos of cats and dogs. When that happens, at that moment, User A, User B, User C, and User D are all similar and enjoy similar types of media. Thus clearly, similarities are dynamic and change constantly. Therefore the similarity established between Users A, B, C and D are temporary. Any of those users may, at any time, change their interests, thus changing their position in the virtual space, resulting in a different set of recommended media items.

In the example embodiment above, it is clear that the virtual space is organized according to likeness. Both users and media are organized in such a way that they if User A likes Media Item A, and if Media Item B is next to Media Item A, then User A also likes Media Item B. However the organization and classification need not be based on likeness only, and in fact need not be based on likeness at all. In an example embodiment, say the user groups are students in a university. Say these user groups are classified by their chosen major. Say, all engineering students (Electrical, Chemical, etc.) are required to take the same course in their sophomore year. All students associated with the required course may be clustered together. Again those very students may be clustered differently when major specific courses need to be signed up for. This may enable creating a plurality of study groups, or/and forecasting the resources required by the university to organize their curriculum, semester, etc. Therefore, clearly as is shown above, entirely objective criteria may be used to determine similarity, in this case similarity of purpose. Users may be classified by more objective or more subjective criteria depending on the needs of the recommendation engine. Other variations are possible as would be apparent to a person having ordinary skill in the art.

FIG. 7 is a screen shot in the beginning phase of the terraforming process, and illustrating that the closest media items to a user at any given point in time act as the recommended media items for that user. The user is the purple square, and the recommended items for that user are highlighted in green.

Preferred embodiments include an algorithm that implements a rate function which is invoked when a user rates a media item. An example embodiment has a rating range of 1 through 5, its purpose being to shift both the user's position and the media item's position in the virtual space to account for the user's rating. Preferably, a vector is first calculated between a user and a media item. Secondly, a determination is made as to whether the user and media item should move toward each other or away from each other. The severity of the rating determines the amount that the user and media item should shift in either direction. The number of times that media item has been rated is also taken into account, wherein the greater the number of times a media item has been rated, the lesser the severity of the shift for the media item receiving the same rating. The user's movement however, is not hindered by that number. Based on the above calculated rating and its' severity, the shift is made, and the user and the media item are given new X, Y, and Z coordinates within the virtual space.

Figure 8:
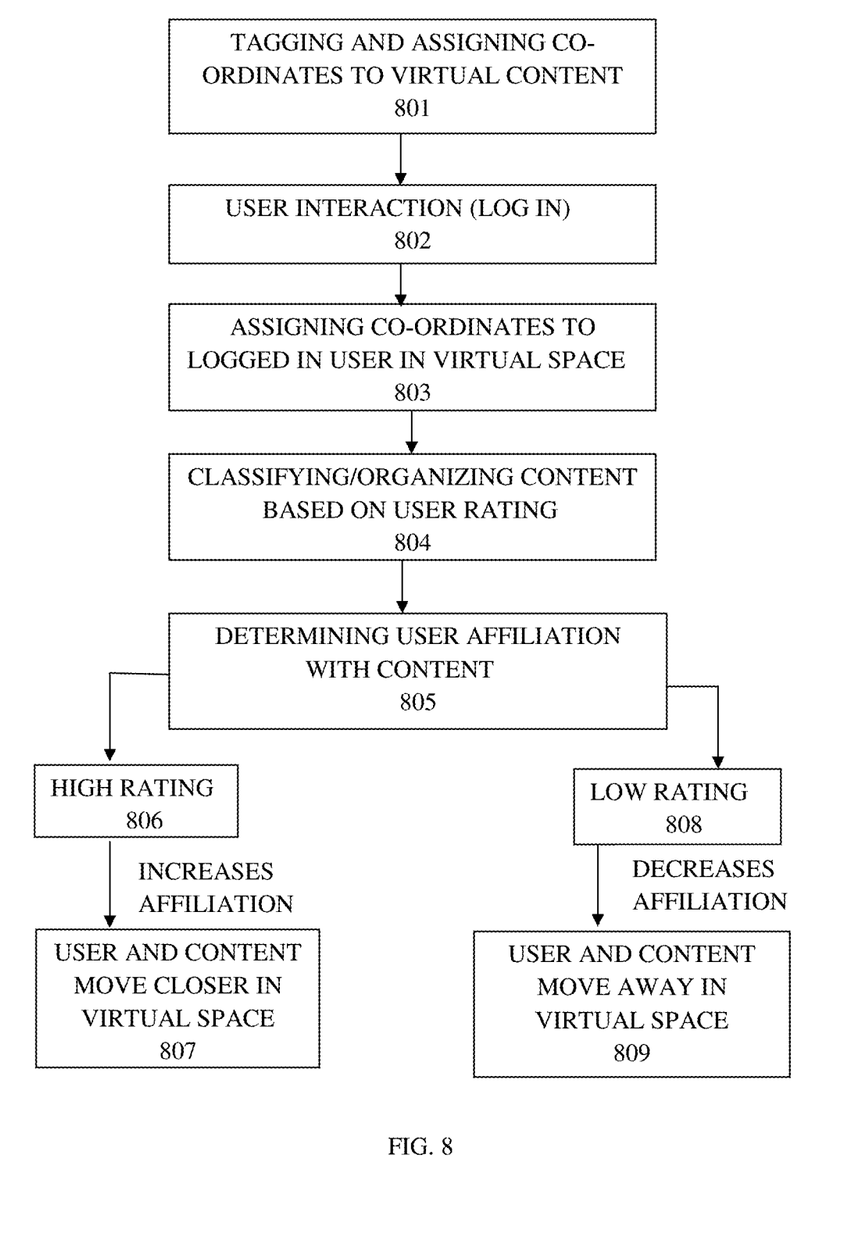
FIG. 8 illustrates a flow chart of the method of classifying and organizing users based on their interaction and affiliation with virtual content.

FIG. 8 illustrates via a flow chart, the process of classifying and organizing users based on their interaction and affiliation with virtual content. In step 801, all content in the virtual space is tagged and coordinates are assigned to the tagged content items. In step 802 the user begins interaction in the virtual space. Step 803 entails assigning coordinates to every user interacting in the virtual space. Content consumed by users is rated and the rated content is classified and organized with respect to the user, in step 804. Organization of content includes determining user affiliation with the content (step 805) wherein a high rating (step 806) increases user affiliation with content and the user and content item are caused to move closer to each other (step 807). On the other hand a low rating (step 808) decreases user affiliation with the content item and the user and content item are caused to move away from each other (step 809). This flow causes content in the virtual space to naturally progress to a state of organization based on user preferences, wherein preferences can comprise, likeness, interest, affiliation, purpose, etc.

Figure 9:
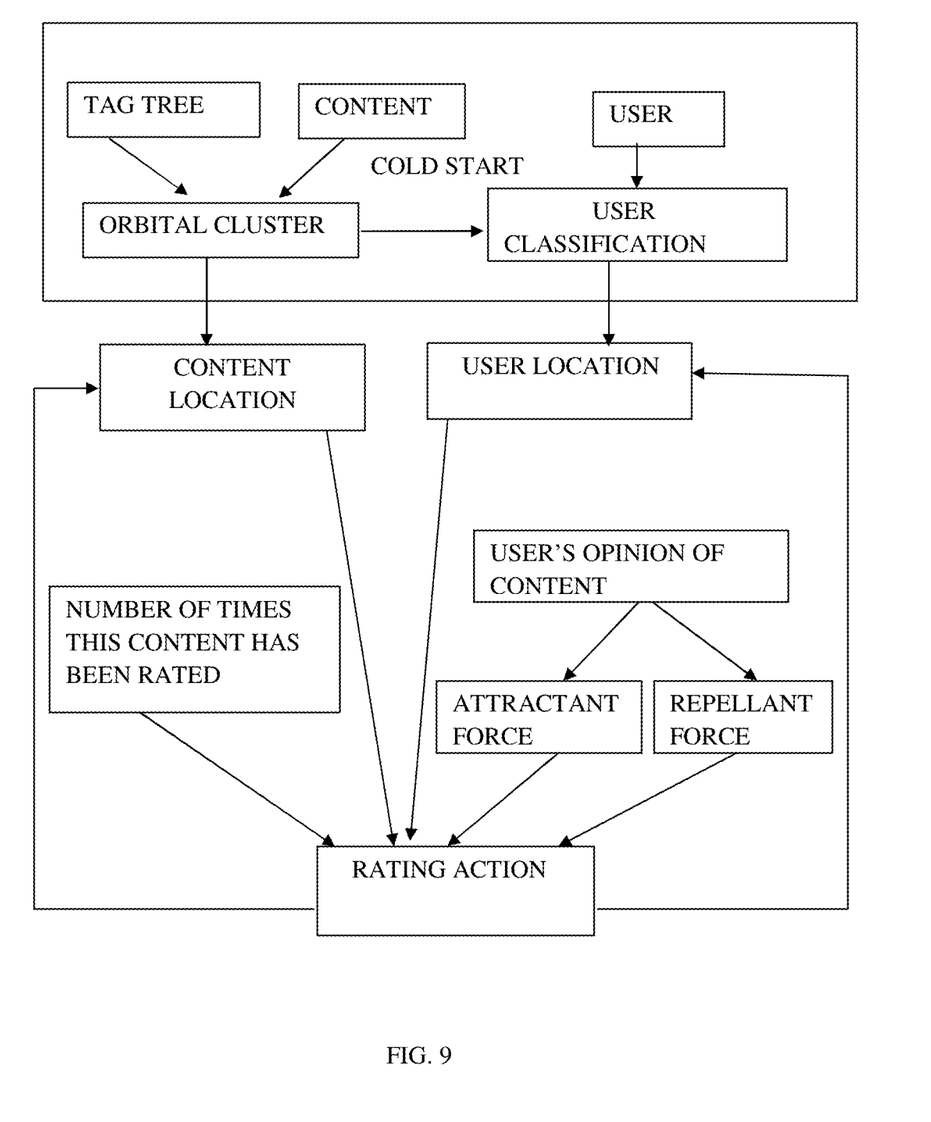
FIG. 9 is a self-explanatory diagram illustrating further structural, process and dimensional detail illustrated in FIG. 8.

FIG. 9 is a self-explanatory diagram illustrating further structural, process and dimensional detail illustrated in FIG. 8. The cold start comprises the orbital cluster formation and user and content classification, tagging and coordinate assigning. Content and user location in the virtual space, determined by user affiliation/opinion of content, and the subsequent number of times the content is rated, accentuating attractant or repellant forces as the case may be and continuously, dynamically aligning and realigning users with respect to content items, users with respect to other users, and content items with respect to other content items creating a structured multi-dimensional space that naturally, automatically, organizes and reorganizes itself.

The API that interfaces with this database is platform-independent and can transparently handle the cold start and continuous rating actions. The entire engine is modular and can be integrated with an existing database structure. Preferred embodiments allow the client to specify the options for the engine such as number of dimensions, tags, and tag hierarchy.

Preferred embodiments include a content table which stores the number of ratings and the coordinates of each content item. A user table stores the coordinates of each user, and a tag table stores the human-readable text of the tag and its parent tag. Preferably a tag content table associates tags with content.

The rating action is a simple API call that can be inserted anywhere in an existing application. It can be triggered by certain user actions in an application such as directly rating content in a binary manner or a spectrum/scale. It can also be triggered through involuntary user behavior such as length of time viewed for content or repeated visits to content. This rating API call takes as parameters: user, content, and rating.

The retrieval of recommended content for a particular user is another API call. It returns a list of that user's most recommended content at any point in time. It takes as parameters: user and number of content items to return.

In addition to these API calls, there is a visualizer that allows the client to view the entire virtual space and its content and users. While embodiments disclosed allow this for instances using up to three dimensions, it is possible to have a visualizer that enables viewing in multiple dimensions either partially or wholly, as would be apparent a person having ordinary skill in the art.

Alternatively, there is also a testing suite that allows the client to simulate user personalities with a tendency toward specific rating patterns. This simulation runs in real time, performing thousands of actions per second and provides means to test the engine's accuracy. The engine's accuracy can be queried at any point in time to determine its efficiency.

Some embodiments of the invention are implemented as a program product for use with an embedded processor. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on static or dynamic storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing by a machine, to cause the machine to perform a series of operations for classifying users and user associated content in a virtual space, comprised in the media/content recommendation engine. The operations comprise tagging all content and users in the virtual space, wherein the said tagging further comprises assigning co-ordinates to each content item and each user in the virtual space. The operations further comprise determining user affiliation with the content in the virtual space, an subsequently the said determining comprises causing the said user and the said content item to travel with respect to each other through the same virtual space. The travel of the content item and the user with respect to each other is based on the user rating of the content such that a high user rating causes the user and the rated content item to move closer together in the virtual space and a low user rating causes the user and the rated content item to move farther apart in the virtual space.

Embodiments disclosed comprise an ultra-rapid, resource-light framework that delivers more relevant and natural content to the user than any other extant system. The result is a stellar and highly customized user experience that is delivered more intelligently, more quickly, and more frugally (i.e. using fewer resources) than any other similar system designed or yet to be designed in the foreseeable future. Alternative embodiments that comprise the core algorithm engine for the invention described can easily be applied and modified to function as an Emotional Recommendation Engine, a Predictive Predatory Detection and Predictive Advertising Recommendation Engine, and other such implementations as would be apparent to a person having ordinary skill in the art. Additionally and alternatively, this embodiments disclosed can also be used independently or applied to Recommendation (and Administration, Management, etc.) Engines for the Medical Industry in Diagnosing a Condition, Pharmaceutical Recommendation Engines, Vehicle Telematics Recommendation Engines, GPS Recommendation Engines, Human Resources Recommendation Engines, University Recommendation Engines (including and not limited to University Administration Engines) and Sport Industry Recommendation Engines (such as golf courses, teaching pros, etc.) Objective estimates of individualities may be asserted based on subjective choices made by the individuals. Objective estimates of future preferences, likes, dislikes, etc. can be asserted based on subjective usage patterns of the said individuals.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

The invention claimed is:

1. A method for organizing and classifying users and user associated media content in a virtual space, comprising:
   tagging all content in the virtual space;
   assigning co-ordinates to the tagged content in the said space;
   assigning every user a coordinate in the virtual space; and
   determining user affiliation with the content in the virtual space, wherein said determining further comprises:
   causing the said user and the said content item to travel with respect to each other through the same virtual space, wherein the said travel with respect to each other is based on the user rating of the content such that a high user rating causes the user and the rated content item to move closer together in the virtual space and a low user rating causes the user and the rated content item to move farther apart in the virtual space; and maintaining number of ratings each media content item receives, wherein the greater the number of ratings received, the less the rated content item is caused to travel with each subsequent rating.

2. The method of claim 1 wherein assigning an initial user coordinate is determined based upon user response to a series of interactive queries presented to the user.

3. The method of claim 1 wherein the user coordinates are repeatedly altered in the virtual space, which alteration is determined by user interaction with the content.

4. The method of claim 1 wherein the said determining of user affiliation further comprises creating a vector between a user selected content item and the assigned user coordinates.

5. The method of claim 1 wherein determining the user affiliation further comprises receiving user rating of the user selected content item in the virtual space, and wherein the user affiliation with the content item is determined according to the user rating of the said content item.

6. The method of claim 5 wherein the user affiliation is at least one of a positive and a negative affiliation.

7. The method of claim 5 wherein a positive user rating causes the content item rated and the user's coordinates to travel towards one another along their vector in the virtual space.

8. The method of claim 5 wherein a negative user rating received causes the content item rated and the user's coordinates to travel away from one another along their vectors in the virtual space.

9. The method of claim 1 further comprising aggregating the ratings of the content items rated, identifying the users' rating the content items, and creating a single or plurality of user interest group clusters based on content items rated by the said users.

10. The method of claim 1 wherein the virtual space comprises multiple dimensions.

11. The method of claim 1 wherein the virtual space comprises three dimensions.

12. A computer automated system for organizing and classifying users and user associated media content in a virtual space, comprising a processing unit and a memory element, and having instructions encoded thereon, wherein the encoded instructions cause the system to:
assign a coordinate to each user in the virtual space;
assign a coordinate to each content item in the virtual space;
allow the user to rate a single or plurality of content items in the virtual space;
determine user affiliation based on their rating of the content;
wherein a high user rating causes the user and the rated content item to move closer together in the virtual space and a low user rating causes the user and the rated content to move farther apart in the virtual space; and
maintain the number of ratings each media content item receives, wherein the greater the number of ratings received, the less the rated content item is caused to travel through the virtual space.

13. The system of claim 12 wherein the instructions further cause the system to:
assign an initial user coordinate based upon user response to a series of interactive queries presented to the user.

14. The system of claim 12 wherein the instructions further cause the system to:
aggregate the ratings of the content items rated, identify the user's rating the content items, and create a single or plurality of user interest group clusters based on content items rated by the said users.

15. The system of claim 12 wherein the virtual space comprises multiple dimensions.

16. The system of claim 12 wherein the virtual space comprises three dimensions.

17. A system for classifying and organizing users and media content in a multi-dimensional virtual space, and for determining which content a user will most likely enjoy, comprising:
a processing unit;
assigning a location to all content in the virtual space;
assigning a location to all users in the virtual space;
causing the said user and the said content item to travel with respect to each other through the same virtual space, wherein the said travel with respect to each other is based on the user rating of the content such that a high user rating causes the user and the rated content item to move closer together in the virtual space and a low user rating causes the user and the rated content item to move farther apart in the virtual space;
causing a user and the content to travel through the virtual space with respect to each other based on the user rating of a content item; and
maintain the number of ratings each media content item receives, wherein the greater the number of ratings received, the less the rated content item is caused to travel through the virtual space.

18. The system of claim 17 wherein assigning an initial user location is determined via user response to a series of interactive queries presented to the user.

19. The system of claim 17 wherein user location is repeatedly altered in the virtual space, and is determined by user interaction with the content.

20. The system of claim 17 wherein the user rating is at least one of a positive and a negative rating.

21. The system of claim 17 wherein a positive user rating causes the content item rated and the user's coordinates to travel towards one another along their vector in the virtual space.

22. The system of claim 17 wherein a negative user rating causes the content item rated and the user's coordinates to travel away from one another along their vector in the virtual space.

23. The system of claim 17 wherein the multi-dimensional virtual space is a three dimensional virtual space.

24. A method for intuitively organizing and classifying users and user associated content within a virtual dimension, comprising:
intelligently assigning a coordinate to each user and each piece of content in the virtual dimension;
adaptively determining the user affiliation with the said piece of content;
wherein said adaptively determining user affiliation comprises:
user rating of the content such that highly rated content is caused to move closer to the user in the virtual dimension, and lowly rated content is caused to move further away from the user in said virtual dimension;
calculating a vector between a user-viewed piece of content and the user; and
determining how the piece of content should be positioned in relation to the user; wherein said determining comprises determining how close or far the piece of content should be moved from the user, which determining is further based on the rating by the user and at least one of the number of times it has been rated by that user and the number it has been rated by any user; and maintaining number of ratings each media content item receives, wherein the greater the number of ratings received, the less the rated content item is caused to travel with each subsequent rating.

25. A system for intuitively organizing and classifying users and user associated content within a virtual dimension, comprising a processing unit and a memory element, and having thereon encoded instructions which cause the system to:

intelligently assign a coordinate to each user and each piece of content in the virtual dimension;

adaptively determine the user affiliation with the said piece of content;

wherein said adaptive determination of user affiliation comprises:

user rating of the content such that highly rated content is caused to move closer to the user in the virtual dimension, and lowly rated content is caused to move further away from the user in said virtual dimension;

calculating a vector between a user-viewed piece of content and the user; and determine how the piece of content should be positioned in relation to the user;

wherein said determining comprises determining how close or far the piece of content should be moved from the user, which determining is further based on the rating by the user and at least one of the number of times it has been rated by that user and the number it has been rated by any user; and maintaining number of ratings each media content item receives, wherein the greater the number of ratings received, the less the rated content item is caused to travel with each subsequent rating.

26. The method of claim 1 further comprising:

intelligently assigning a coordinate to each user and each content item in the virtual dimension;

adaptively determining the user affiliation with the said content item;

wherein said adaptively determining user affiliation comprises:

user rating of the content such that highly rated content is caused to move closer to the user in the virtual dimension, and lowly rated content is caused to move further away from the user in said virtual dimension;

calculating a vector between the content item and the user; and determining how the content item should be positioned in relation to the user; wherein the said determining comprises determining how close or far the content item should be moved from the user, which determining is further based on the rating by the user and at least one of the number of times it has been rated by that user and the number it has been rated by any user.

27. The computer automated system of claim 12 wherein the system is further caused to, in the virtual space:

calculate a vector between the user and a consumed content item;

receive a user rating of the content item;

determine, based on the received rating, whether the user and the content item should move toward each other or away from each other in the virtual space;

determine, based on the rating received by the user, the amount that the user and the content item should shift in either direction in the virtual space;

wherein the greater the number of times that the content item has been rated, the lesser the severity of the shift for the content item for each subsequent rating; and wherein the user's movement is not hindered by that severity.

28. The computer automated of claim 12 wherein the system is further caused to:

intelligently assign a coordinate to each user and each content item in the virtual space;

adaptively determine the user affiliation with the said content item;

wherein the said adaptive determination of user affiliation comprises:

user rating of the content such that highly rated content is caused to move closer to the user in the virtual space, and lowly rated content is caused to move further away from the user in said virtual space;

calculating a vector between a consumed content item and the user; and determine how the piece of content should be positioned in relation to the user;

wherein the said determining comprises determining how close or far the piece of content should be moved from the user, which determining is further based on the rating by the user and at least one of the number of times it has been rated by that user and the number it has been rated by any user.

* * * * *